(12) United States Patent
Pierce et al.

(10) Patent No.: US 12,440,067 B2
(45) Date of Patent: Oct. 14, 2025

(54) SYSTEMS FOR STAND MIXER ASSEMBLY LOCATING

(71) Applicant: Haier US Appliance Solutions, Inc., Wilmington, DE (US)

(72) Inventors: Andrew Pierce, Louisville, KY (US); Matthew R. Hunter, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 769 days.

(21) Appl. No.: 17/725,705

(22) Filed: Apr. 21, 2022

(65) Prior Publication Data

US 2023/0337860 A1    Oct. 26, 2023

(51) Int. Cl.
*A47J 43/044*    (2006.01)
*A47J 43/08*    (2006.01)

(52) U.S. Cl.
CPC ............. *A47J 43/044* (2013.01); *A47J 43/08* (2013.01); *A47J 2043/04454* (2013.01)

(58) Field of Classification Search
CPC . A47J 43/08; A47J 43/044; A47J 2043/04454
See application file for complete search history.

(56) References Cited

U.S. PATENT DOCUMENTS

| | | | | |
|---|---|---|---|---|
| 2,765,676 A | * | 10/1956 | Polivka | A47J 43/044 74/606 R |
| 3,533,715 A | * | 10/1970 | Gross | A47J 43/044 416/174 |
| 3,951,351 A | * | 4/1976 | Ernster | H02K 7/145 366/601 |
| 4,325,643 A | * | 4/1982 | Scott | A47J 43/0755 241/101.1 |
| 4,510,404 A | * | 4/1985 | Barrett | H05K 7/1427 409/182 |
| 4,544,278 A | * | 10/1985 | Elkerbout | A47J 43/044 403/17 |
| 5,000,578 A | * | 3/1991 | Artin | A47J 43/082 366/100 |
| 5,524,530 A | * | 6/1996 | Nijzingh | B01F 27/13 241/37.5 |

FOREIGN PATENT DOCUMENTS

| | | |
|---|---|---|
| AU | 2014253470 B2 | 7/2018 |
| EP | 2623001 A1 | 8/2013 |
| EP | 2465396 B1 | 12/2014 |
| FR | 3048599 B1 | 4/2018 |

* cited by examiner

*Primary Examiner* — Marc C Howell
(74) *Attorney, Agent, or Firm* — Dority & Manning, P.A.

(57) ABSTRACT

A stand mixer includes a casing that includes a base, a column mounted to the base, and a motor housing mounted to the column. The motor housing extends outwardly above the base. A motor is within the motor housing, and the motor housing includes a first portion and a second portion. The second portion includes a standoff. The first portion includes a slot. The standoff of the second portion is configured to engage with the slot of the first portion.

16 Claims, 5 Drawing Sheets

SYSTEMS FOR STAND MIXER ASSEMBLY LOCATING

FIELD OF THE INVENTION

The present subject matter relates generally to systems for stand mixer assembly positioning.

BACKGROUND OF THE INVENTION

Stand mixers are generally used for performing automated mixing, churning, or kneading involved in food preparation. Typically, stand mixers include a motor configured to provide torque to one or more driveshafts. Users may connect various utensils to the one or more driveshafts, including whisks, spatulas, or the like. In stand mixers, the housing for the motor is conventionally created in two parts for assembly. It is desirable for the manufacturer that the gap between the two parts is flush around the perimeter of the two components. The gap between the first and second portions of the housing is attempted to be maintained at a constant value for the sake of craftsmanship. In current practice, the location of the two components to each other is set by either a pattern of fasteners or by a protrusion around the entire perimeter, both styles requiring tight tolerances difficult to consistently reproduce in manufacturing.

BRIEF DESCRIPTION OF THE INVENTION

Aspects and advantages of the invention will be set forth in part in the following description, or may be apparent from the description, or may be learned through practice of the invention.

In one example embodiment, a stand mixer includes a casing that includes a base, a column mounted to the base, and a motor housing mounted to the column. The motor housing extends outwardly above the base. A motor is within the motor housing, and the motor housing includes a first portion and a second portion. The second portion includes a standoff. The first portion includes a slot. The standoff of the second portion is configured to engage with the slot of the first portion.

In another example embodiment, a stand mixer includes a casing that includes a base, a column mounted to the base, and a motor housing mounted to the column. The motor housing extends outwardly above the base. A motor is disposed within the motor housing. The motor housing includes a first end and a second end. The motor housing mounts to the column at the second end. The motor housing includes a second portion including a plurality of standoffs at the first end. The plurality of standoffs positioned with at least one standoff in a different hemisphere, horizontally, of the first end. The second portion includes at least one standoff at the second end. A first portion includes a slot that extends around a perimeter of the first portion. The standoffs of the second portion are configured to engage with the slot of the first portion. The plurality of standoffs the first end restrains translation while the at least one standoff of the second end restrains rotation in a horizontal plane of the first portion relative to the second portion.

In another example embodiment, a stand mixer includes a casing that includes a base, a column mounted to the base, and a motor housing mounted to the column. The motor housing extends outwardly above the base. A motor is disposed within the motor housing. The motor housing includes a first end and a second end. The motor housing mounts to the column at the second end. The motor housing includes a second portion that includes at least three standoffs at the first end and at least two standoffs at the second end. A first portion includes a slot that extends around a perimeter of the first portion. The standoffs of the second portion are configured to engage with the slot of the first portion. The standoff of the second portion in the slot of the first portion restrains rotation and translation in a horizontal plane of the first portion relative to the second portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
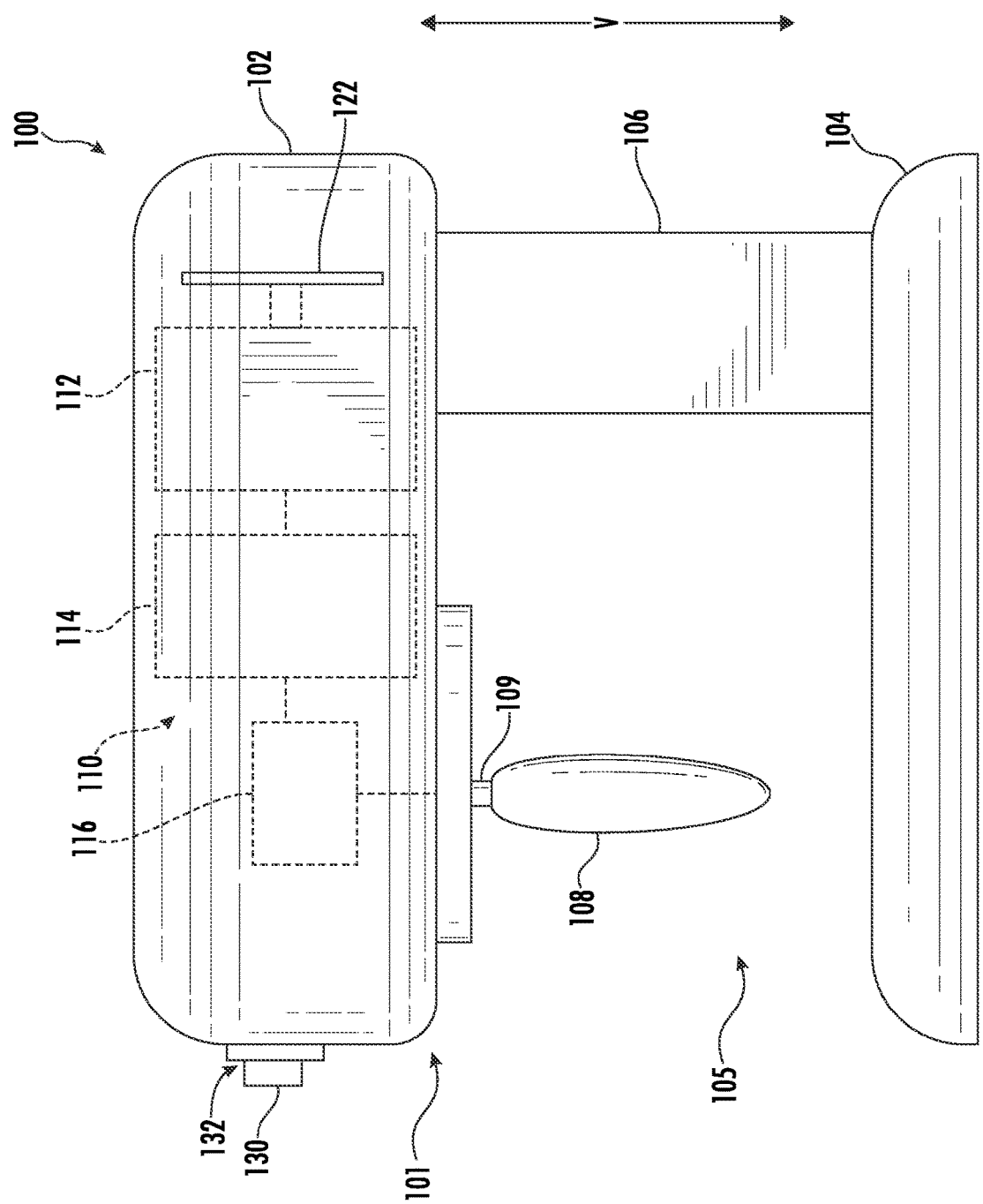
FIG. 1 provides a side section view of a stand mixer according to an example embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

FIG. 1 provides a side, elevation view of a stand mixer 100 according to an example embodiment of the present subject matter. It will be understood that stand mixer 100 is provided by way of example only and that the present subject matter may be used in or with any suitable stand mixer in alternative example embodiments. Moreover, stand mixer 100 of FIG. 1 defines a vertical direction V and a transverse direction T, which are perpendicular to each other. It should be understood that these directions are presented for example purposes only, and that relative positions and locations of certain aspects of stand mixer 100 may vary according to specific embodiments, spatial placement, or the like.

Stand mixer 100 may include a casing 101. In detail, casing 101 may include a motor housing 102, a base 104, and a column 106. Motor housing 102 may house various mechanical and/or electrical components of stand mixer 100, which will be described in further detail below. For example, as shown in FIG. 1, a motor 112, a planetary or reduction gearbox 114, and a bevel gearbox 116 may be disposed within motor housing 102. Base 104 may support motor housing 102. For example, motor housing 102 may be mounted (e.g., pivotally) to base 104 via column 106, e.g., that extends upwardly (e.g., along the vertical direction V) from base 104. Motor housing 102 may be suspended over a mixing zone 105, within which a mixing bowl may be disposed and/or mounted to base 104.

A drivetrain 110 may be provided within motor housing 102 and is configured for coupling motor 112 to a shaft 109 (e.g., a mixer shaft), such that shaft 109 is rotatable via motor 112 through drivetrain 110. Drivetrain 110 may include planetary gearbox 114, bevel gearbox 116, etc. An opening 132 for a horizontal accessory shaft 130 may align with the rotational axis of motor 112. Mixer shaft 109 may be positioned above mixing zone 105 on motor housing 102, and an attachment 108, such as a beater, whisk, or hook, may be removably mounted to mixer shaft 109. Attachment 108 may rotate within a bowl (not shown) in mixing zone 105 to beat, whisk, knead, etc. material within the bowl during operation of motor 112.

As noted above, motor 112 may be operable to rotate mixer shaft 109. Motor 112 may be a direct current (DC) motor in certain example embodiments. In alternative example embodiments, motor 112 may be an alternating current (AC) motor. Motor 112 may include a rotor and a stator. The stator may be mounted within motor housing 102 such that the stator is fixed relative to motor housing 102, and the rotor may be coupled to mixer shaft 109 via drivetrain 110. A current through windings within the stator may generate a magnetic field that induces rotation of the rotor, e.g., due to magnets or a magnetic field via coils on the stator. The rotor may rotate at a relatively high rotational velocity and relatively low torque. Thus, drivetrain 110 may be configured to provide a rotational speed reduction and mechanical advantage between motor 112 and mixer shaft 109.

Stand mixer 100 may include a controller 122 provided within casing 101. For example, controller 122 may be located within motor housing 102 of casing 101. Controller 122 may be a microcontroller, as would be understood, including one or more processing devices, memory devices, or controllers. Controller 122 may include a plurality of electrical components configured to permit operation of stand mixer 100 and various components therein (e.g., motor 112). For instance, controller 122 may be a printable circuit board (PCB), as would be well known.

As used herein, the terms "control board," "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 122 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 122 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

Figure 2:
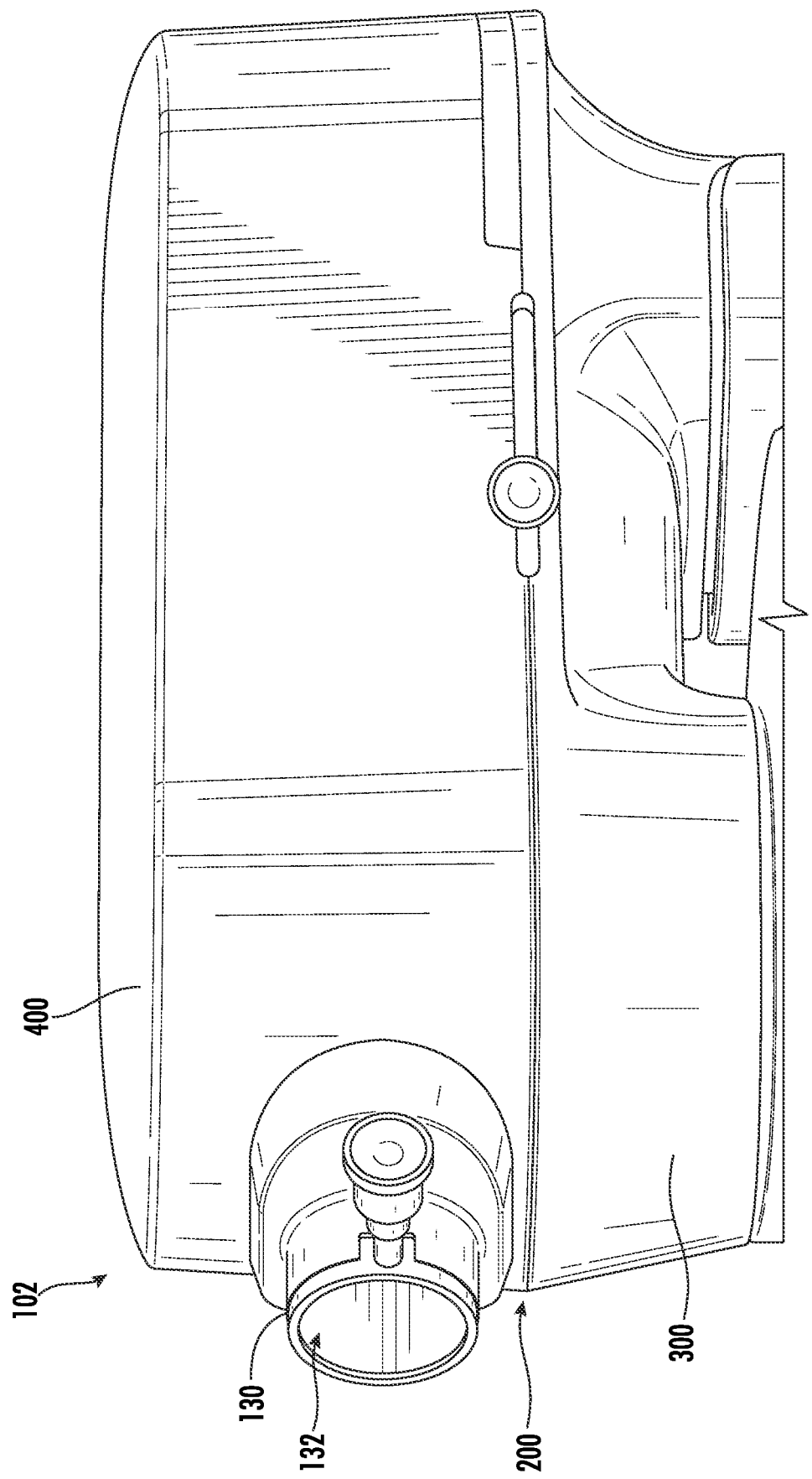
FIG. 2 provides a perspective view of a motor housing of the example stand mixer of FIG. 1.

FIG. 2 illustrates a perspective view of motor housing 102. As shown, motor housing 102 may include a first portion 400 and a second portion 300. Thus, e.g., motor housing 102 may include a two-piece structure that collectively forms motor housing 102. Moreover, first portion 400 may couple to second portion 300 to form motor housing 102. Second portion 300 may be mounted, e.g., pivotally, to column 106. A seam 200 may be defined between the first and second portions 400, 300. The seam 200 between the two portions, 300 and 400, may be flush around all sides of motor housing 102. The flush seam 200 may correlate to standoffs 310 (FIG. 3) on second portion 300 engaging in a slot 410 (FIG. 5) of first portion 400. Standoffs 310 will be described in further detail below. Standoffs 310 permits tight dimensional control of small surfaces and ensures that second portion 300 and first portion 400 couple together in the desired location. Thus, standoffs 310 may produce consistent gaps between the portions 300, 400 at seam 200. When seam 200 is flush, e.g., such that adjacent surfaces of first and second portion 300, 400 are flush, a user of stand mixer 100 may advantageously perceive stand mixer 100 as of higher quality. In contrast, if seam 200 were not flush, horizontal accessory shaft 130 may not align with the rotational axis of motor 112, which may negatively affect the operation of stand mixer 100.

Figure 3:
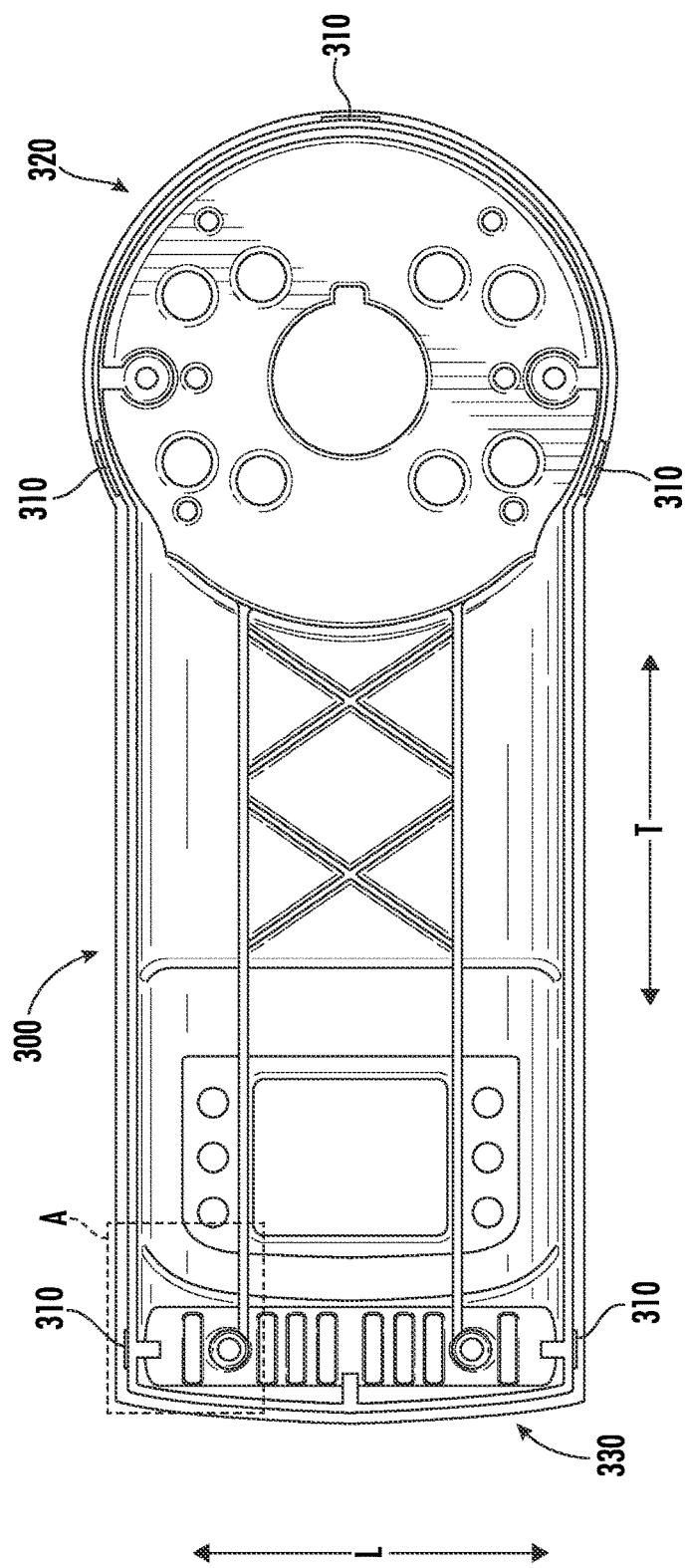
FIG. 3 provides a top, schematic view of a second portion of the motor housing of FIG. 2.

FIG. 3 illustrates a schematic top view of second portion 300. In the presented example embodiment of FIG. 3, there are five standoffs 310. Standoffs 310 may be cast with second portion 300, e.g., such that standoffs 310 are integrally formed from second portion 300. One skilled in the art would appreciate that there may be more or less than five standoffs 310 on second portion 300, as well as that the cast standoffs 310 may require additional machining to maintain tolerances. Thus, e.g., motor housing 102 may include two, three, four, six, or more standoffs 310, in alternative example embodiments. Second portion 300 may include a first end 320 and a second end 330. First end 320 may include three standoffs 310 spaced around first end 320 to form a concentric circle. At least one standoff 310 of the three standoffs 310 may be spaced such that at least one standoff 310 is in a different hemisphere than the other two standoffs 310 in the concentric circle. Such positioning of the standoffs 310 at first end 320 of second portion 300 may restrain the movement of first portion 400 in the lateral direction L and/or the transverse direction T, or in a horizontal plane, thus the standoffs 310 at first end 320 of second portion 300 may act as a four-way locator. For example, the positioning of standoffs 310 around first end 320 may create a geometry of a circular, round shape, such that standoffs 310 on first end 320 may collectively behave together as a pin behaves in a hole, by restraining the movement of first portion 400 in the lateral direction L and the transverse direction T, but not preventing rotation.

Figure 4:
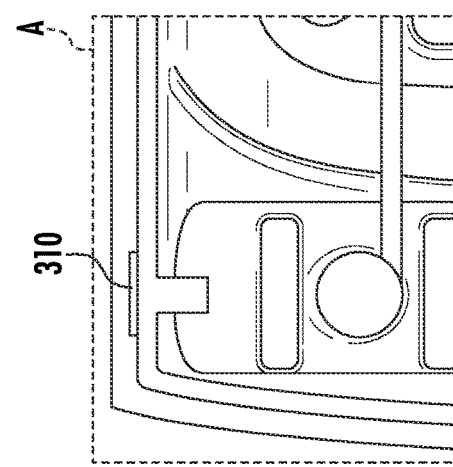
FIG. 4 provides a section view of the second portion of FIG. 3.
Figure 7:
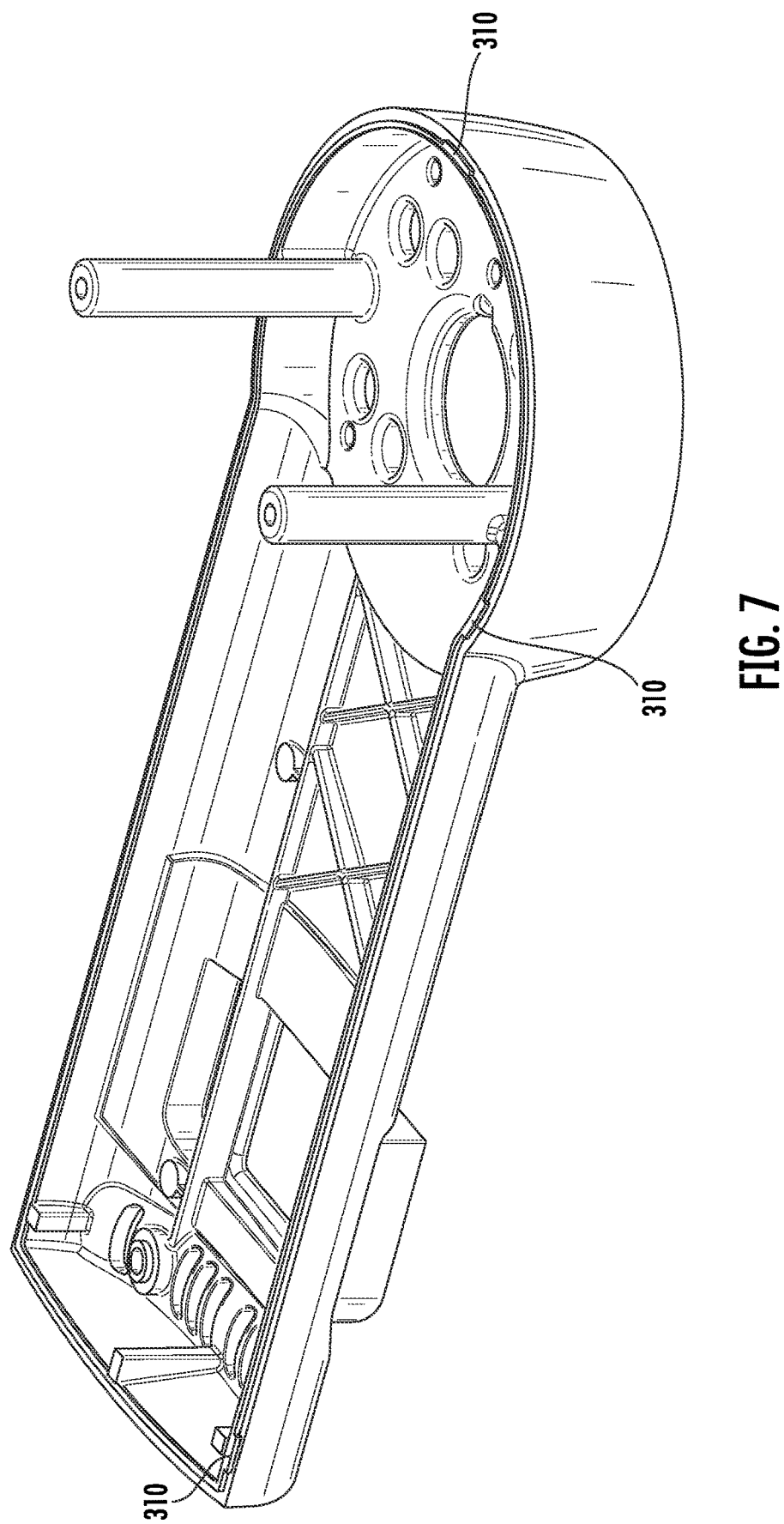
FIG. 7 provides a perspective view of the second portion of the motor housing of FIG. 2.

Second end 330 may include two standoffs 310 on opposing sides, with respect to the lateral direction L. Standoffs 310 on second end 330 may prevent rotation of first portion 400, about the vertical axis, V, thus acting as a two-way locator. For example, the positioning of standoffs 310 on second end 330 may create a geometry of a rectangle, such that standoffs 310 on first end 320 may collectively behave together as a tab behaves in a slot, by restraining the motion in at least the lateral direction L, which prevents the rotation of first portion 400 about the vertical axis V. One skilled in the art would appreciate that standoffs 310 may be used with other shaped motor housings, such as motor housings with two round ends or two rectangular ends. Further seen in FIG. 4, a section view, A, of FIG. 3, specifically an additional view of one of standoffs 310 on second end 330 is shown. Standoff 310 may protrude at least three millimeters (3 mm) in the lateral direction L, may span at least twelve millimeters (12 mm) in the transverse direction T, and may rise at least three millimeters (3 mm) in the vertical direction V. Standoff 310 may also be seen in FIG. 7.

Figure 5:
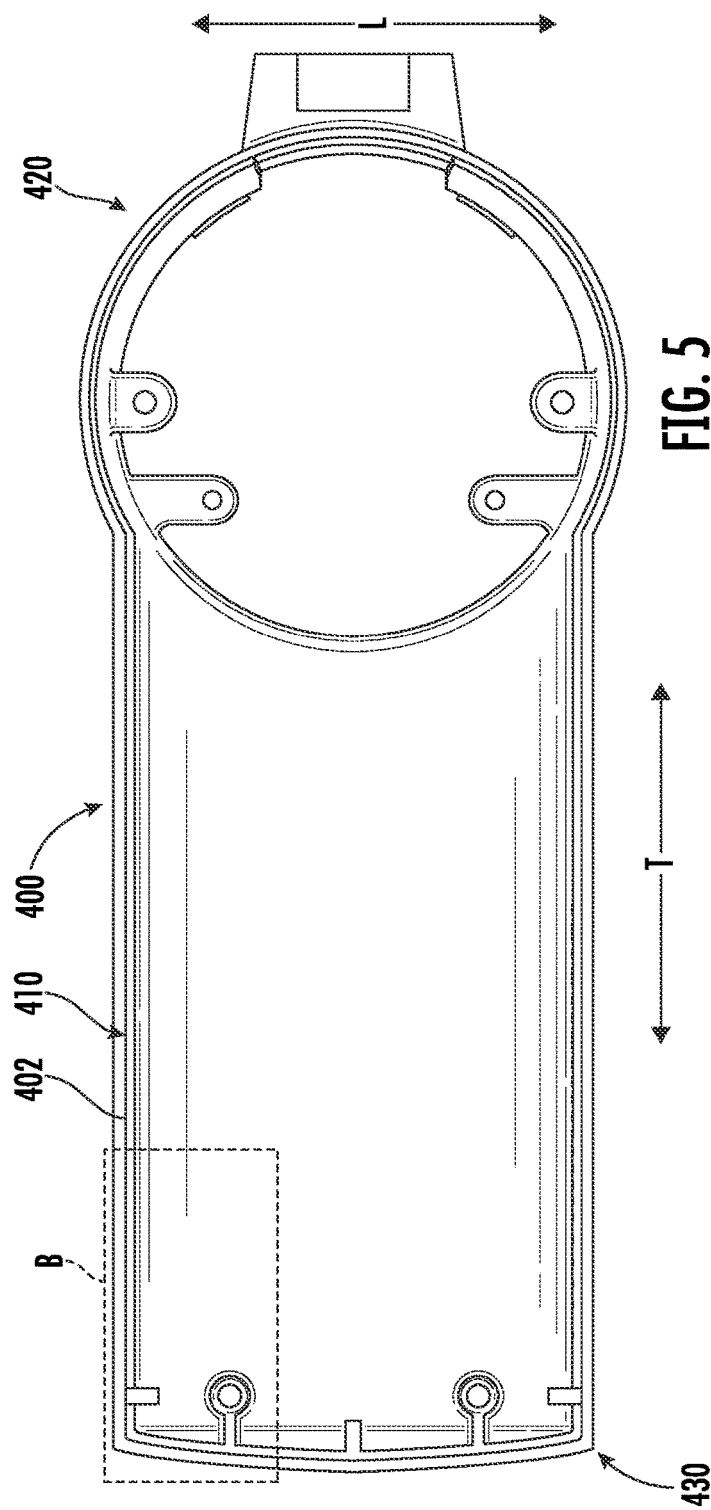
FIG. 5 provides a bottom, schematic view of a first portion of the motor housing of FIG. 2.
Figure 6:
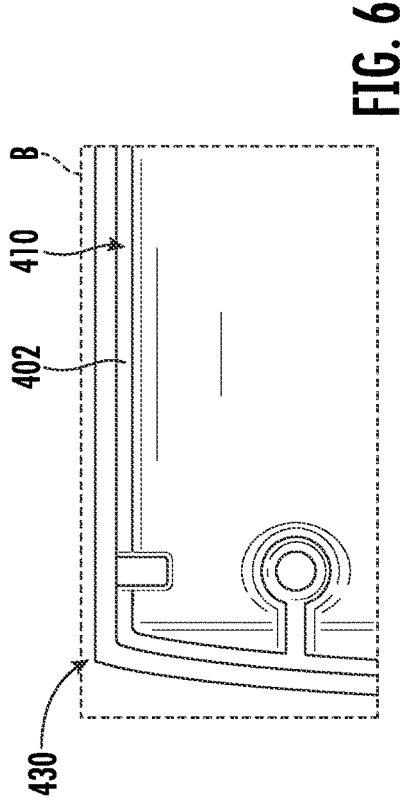
FIG. 6 provides a section view of the first portion of FIG. 5.

FIG. 5 illustrates a schematic bottom view of first portion 400. First portion 400 may include a first end 420 and a second end 430. First end 420 and second end 430 may include a slot 410 defining a bottom mounting surface 402. Slot 410 may be an opening, space, gap, or indentation, etc. Slot 410 may restrain the movement of first portion 400 in the lateral direction L and the transverse direction T, as well as prevent rotation of first portion 400, about the vertical axis V, when coupled to second portion 300. Further, FIG. 6 illustrates a section view, B, of FIG. 5, specifically an additional view of slot 410 on second end 430. Slot 410 may be at least three millimeters (3 mm) deep and may span the perimeter of first portion 400.

Referring again to FIG. 2, in the assembly of motor housing 102 standoffs 310 of second portion 300 may locate first portion 400 onto second portion 300, by fitting into slot 410 of first portion 400. For example, standoffs 310 of second portion 300 may engage with slot 410 to close the gap between the outer flange along the perimeter of the first portion 400 and the inner wall of motor housing 102. Motor housing may have a seam 200 between the first portion 400 and second portion 300. Standoffs 310 and slot 410 may fit together such that seam 200 is a uniform, flush gap around the perimeter of motor housing 102. This may impact the assembly of the stand mixer 100. For example, when seam 200 is uniform and flush, fasteners (not shown) may be put into the motor housing to secure the components together while maintaining the correct alignment for motor 112 and horizontal accessory shaft 130.

As may be seen above, stand mixer 100 includes standoffs 310 that may be placed in specific locations on second portion 300 to create geometry that has a circular, round, shape and geometry that has a tab, rectangular, shape. Implementing the plurality of standoffs 310 of second portion 300 engaging in slot 410 of first portion 400 of stand mixer 100 may ensure that a uniform gap of seam 200 is held around the perimeter of motor housing 102. By doing so, fasteners of motor housing 102 may engage, and the alignment of opening 132 for horizontal accessory shaft 130 to motor 112 may be maintained.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A stand mixer, comprising:
    a casing that comprises a base, a column mounted to the base, and a motor housing mounted to the column and extending outwardly above the base; and
    a motor within the motor housing;
    wherein the motor housing comprises a first portion and a second portion, the second portion comprising a standoff, the first portion comprising a slot, the standoff of the second portion configured to engage with the slot of the first portion,
    wherein the standoff of the second portion is one of a plurality of standoffs in the second portion, and
    wherein a first set of the plurality of standoffs are distributed in a concentric circle at a first end of the motor housing, and a second set of the plurality of standoffs are positioned on opposite sides of the second portion at a second end of the motor housing.

2. The stand mixer of claim 1, wherein the standoff of the second portion in the slot of the first portion restrains rotation and translation in a horizontal plane of the first portion relative to the second portion.

3. The stand mixer of claim 1, wherein the slot of the first portion extends around a perimeter of the first portion, and the plurality of standoffs are distributed along a perimeter of the second portion.

4. The stand mixer of claim 1, wherein the first set of the plurality of standoffs comprises at least three standoffs, and the second set of the plurality of standoffs comprises at least two standoffs.

5. The stand mixer of claim 1, wherein the second portion of the motor housing comprises an inset wall that extends along a perimeter of the second portion of the motor housing, a distal end of the inset wall received within the first portion of the motor housing, the standoff extending between the inset wall of the second portion of the motor housing and an inner surface of the first portion of the motor housing that defines the slot.

6. The stand mixer of claim 1, wherein the first and second portions of the motor housing are separate castings, the slot is cast into the first portion of the motor housing, and the standoff is cast into the second portion of the motor housing.

7. The stand mixer of claim 1, wherein a seam between the first portion and the second portion of the motor housing is uniform around a perimeter of the motor housing.

8. A stand mixer, comprising:
a casing that comprises a base, a column mounted to the base, and a motor housing mounted to the column, the motor housing extending outwardly above the base; and
a motor disposed within the motor housing, the motor housing comprising a first end and a second end, the motor housing mounts to the column at the second end, the motor housing comprising,
a second portion comprising a plurality of standoffs at the first end, the plurality of standoffs positioned with at least one standoff in a different hemisphere, horizontally, of the first end, the second portion comprising at least one standoff at the second end, and
a first portion comprising a slot that extends around a perimeter of the first portion, the standoffs of the second portion configured to engage with the slot of the first portion,
wherein the plurality of standoffs the first end restrains translation while the at least one standoff of the second end restrains rotation in a horizontal plane of the first portion relative to the second portion.

9. The stand mixer of claim 8, wherein a first set of the plurality of standoffs are distributed in a concentric circle at the first end of the motor housing, and a second set of the plurality of standoffs are positioned on opposite sides of the second portion at the second end of the motor housing.

10. The stand mixer of claim 8, wherein the first and second portions of the motor housing are separate castings, the slot is cast into the first portion of the motor housing, and the standoffs are cast into the second portion of the motor housing.

11. The stand mixer of claim 8, wherein a seam between the first portion and the second portion of the motor housing is uniform around a perimeter of the motor housing.

12. A stand mixer, comprising:
a casing that comprises a base, a column mounted to the base, and a motor housing mounted to the column, the motor housing extending outwardly above the base; and
a motor disposed within the motor housing, the motor housing comprising a first end and a second end, the motor housing mounting to the column at the second end, the motor housing comprising,
a second portion comprising at least three standoffs at the first end and at least two standoffs at the second end, and
a first portion comprising a slot that extends around a perimeter of the first portion, the standoffs of the second portion configured to engage with the slot of the first portion
wherein the standoffs of the second portion in the slot of the first portion restrains rotation and translation in a horizontal plane of the first portion relative to the second portion.

13. The stand mixer of claim 12, wherein the standoffs are distributed in a concentric circle at the first end of the motor housing, and the standoffs are positioned on opposite sides of the second portion at the second end of the motor housing.

14. The stand mixer of claim 12, wherein the second portion of the motor housing comprises an inset wall that extends along a perimeter of the second portion of the motor housing, a distal end of the inset wall received within the first portion of the motor housing, the standoffs extending between the inset wall of the second portion of the motor housing and an inner surface of the first portion of the motor housing that defines the slot.

15. The stand mixer of claim 12, wherein the first and second portions of the motor housing are separate castings, the slot is cast into the first portion of the motor housing, and the standoffs are cast into the second portion of the motor housing.

16. The stand mixer of claim 12, wherein a seam between the first portion and the second portion of the motor housing is uniform around a perimeter of the motor housing.

\* \* \* \* \*